United States Patent
Raj et al.

(10) Patent No.: US 11,100,226 B1
(45) Date of Patent: Aug. 24, 2021

(54) SYSTEMS AND METHODS FOR IDENTIFYING A MALICIOUS USER INTERFACE

(71) Applicant: Symantec Corporation, Mountain View, CA (US)

(72) Inventors: Vinith Raj, Los Angeles, CA (US); Mohit Jha, Torrance, CA (US)

(73) Assignee: NortonLifeLock Inc., Tempe, AZ (US)

( * ) Notice: Subject to any disclaimer, the term of this patent is extended or adjusted under 35 U.S.C. 154(b) by 472 days.

(21) Appl. No.: 15/945,694

(22) Filed: Apr. 4, 2018

(51) Int. Cl.
| G06F 21/00 | (2013.01) |
| G06F 21/56 | (2013.01) |
| G06F 21/44 | (2013.01) |
| G06F 21/55 | (2013.01) |

(52) U.S. Cl.
CPC ............ *G06F 21/566* (2013.01); *G06F 21/44* (2013.01); *G06F 21/554* (2013.01); *G06F 2221/033* (2013.01)

(58) Field of Classification Search
CPC ........ G06F 21/566; G06F 21/44; G06F 21/45; G06F 21/50; G06F 21/55; G06F 21/56; G06F 21/554; G06F 21/577; G06F 2221/033; G06F 2221/034; G06F 2221/0735; H04L 63/145
See application file for complete search history.

(56) References Cited

U.S. PATENT DOCUMENTS

| 7,596,701 B2* | 9/2009 | Varghese | G06F 21/36 382/118 |
| 7,661,126 B2* | 2/2010 | Roberts | G06F 21/57 726/2 |
| 7,721,094 B2* | 5/2010 | Roberts | G06F 21/445 713/164 |
| 9,258,330 B2* | 2/2016 | Tsuchitoi | G06F 21/50 |
| 9,646,145 B2* | 5/2017 | Vida | G06F 21/32 |
| 2015/0278293 A1* | 10/2015 | Swierk | G06F 16/2423 726/23 |

OTHER PUBLICATIONS

Thomas Fox-Brewster, "Avast: The 2.3M CCleaner Hack was a Sophisticated Assault on the Tech Industry", Forbes, https://www.forbes.com/sites/thomasbrewster/2017/09/21/avast-ccleaner-attacks-target-tech-industry/#703f0d4845fc (accessed Mar. 21, 2018).

\* cited by examiner

*Primary Examiner* — Hosuk Song
(74) *Attorney, Agent, or Firm* — FisherBroyles, LLP

(57) ABSTRACT

The disclosed computer-implemented method for identifying a malicious user interface may include (1) detecting, at a computing device, a launch of a user interface (UI), (2) gathering characteristics of the UI including a UI image, (3) identifying the UI is not permissible by comparing the UI image to a whitelist including permissible UI images, and (4) performing, when the UI image is not permissible, a security action. Various other methods, systems, and computer-readable media are also disclosed.

21 Claims, 6 Drawing Sheets

SYSTEMS AND METHODS FOR IDENTIFYING A MALICIOUS USER INTERFACE

BACKGROUND

Tactics used by cybercriminals are increasingly more creative. Some types of malware are designed to trick a user into performing acts against the users' best interests by displaying apparently innocuous requests for acts by the users and/or requests for information from the users in efforts to sidestep automated anti-malware techniques. Because the requests appear innocuous, the users are often duped into acting. For example, an infected music player program may present a window requesting users to enter email addresses and respective email passwords to verify user identities prior to playing music. The instant disclosure, therefore, identifies and addresses a need for systems and methods for identifying a malicious user interface.

SUMMARY

As will be described in greater detail below, the instant disclosure describes various systems and methods for identifying a malicious user interface. In examples, malicious user interfaces are user interfaces of programs that attempt to perform malicious acts, such as malware.

In one example, a method for identifying a malicious user interface may include (1) detecting, at a computing device, a launch of a user interface (UI), (2) gathering characteristics of the UI including a UI image, (3) identifying the UI is not permissible by comparing the UI image to a whitelist including permissible UI images, and (4) performing, when the UI image is not permissible, a security action.

In an example, the characteristics may further include (1) a trust rating of a process that launched the UI, (2) a language of the UI, and (3) an authentication identifier. The identifying may further include (1) comparing the trust rating of the process that launched the UI, (2) the language of the UI, and (3) the authentication identifier to the whitelist to identify a mismatch. The method may further include performing the security action when there is a mismatch.

In further examples, the characteristics may further include a language of the UI and the method may further include (1) gathering operating system (OS) characteristics including an OS language, (2) comparing the OS language to the language of the UI to identify a mismatch, and (3) performing the security action when there is a mismatch.

In some embodiments, the characteristics may further include text displayed by the UI and an identification of a process that launched the UI. The method may further include (1) comparing the text displayed by the UI to the identification of the process that launched the UI to identify a mismatch and (2) performing the security action when there is a mismatch.

In examples, the method may further include (1) identifying the UI is a child window of a parent window, (2) identifying a process that launched the child window, (3) identifying a process that launched the parent window, (4) comparing the process that launched the child window to the process that launched the parent window to identify a mismatch, and (5) performing the security action when there is a mismatch.

Moreover, in some embodiments, the security action may include preventing data entry into the UI and displaying a warning on a user display. In some embodiments, the security action may include displaying, on a user display, a pop-up box indicating that the UI is potentially malicious.

In one embodiment, a system for identifying a malicious user interface may include several modules stored in memory, including (1) a detecting module, stored in the memory, that detects a launch of a user interface (UI), (2) a gathering module, stored in the memory, that gathers characteristics of the UI including a UI image, (3) an identifying module, stored in the memory, that identifies the UI is not permissible by comparing the UI image to a whitelist including permissible UI images, and (4) a performing module, stored in the memory, that performs a security action when the UI image is not permissible. The system may also include at least one physical processor that executes the detecting module, the gathering module, the identifying module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, at the computing device, a launch of a user interface (UI), (2) gather characteristics of the UI including a UI image, (3) identify the UI is not permissible by comparing the UI image to a whitelist including permissible UI images, and (4) perform, when the UI image is not permissible, a security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
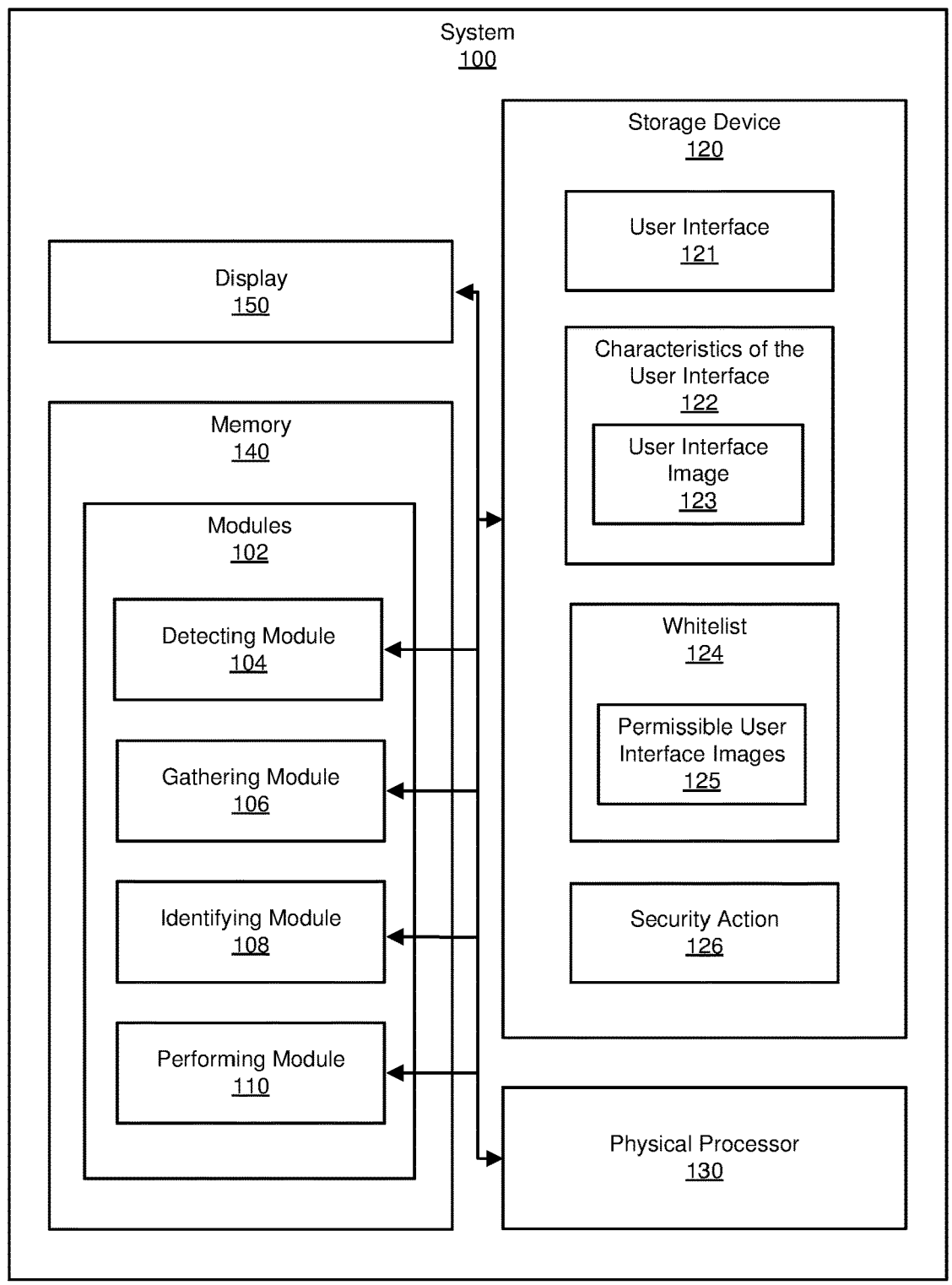
FIG. 1 is a block diagram of an example system for identifying a malicious user interface.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying a malicious user interface. As will be explained in greater detail below, in some examples the systems described herein may enable analyzing user interfaces. In examples, provided techniques may use characteristics of user interfaces, such as languages and processes that launched the user interfaces to automatically infer and/or identify malicious user interfaces. For example, the provided techniques may compare characteristics of user interfaces to whitelists of known good user interface characteristics and/or blacklists of known malicious user interface characteristics to characterize respective user interfaces as permissible and/or impermissible.

By doing so, the systems and methods described herein may improve functioning of a computing device and/or provide targeted protection against malware, and thus improve fields of malware protection in general, by providing a method for automatically identifying malicious and/or suspicious user interfaces. Examples of the provided techniques improve a state of security of target computing devices, potentially resulting in significant time and/or monetary savings. Further, systems and methods described herein may beneficially provide malware protection having a lower cost than other techniques. Thus, disclosed systems and methods may provide asset protection for common targets of malware, such as hospitals, shipping companies, financial companies, governments, etc. by reducing recovery times needed to resume operations.

Figure 2:
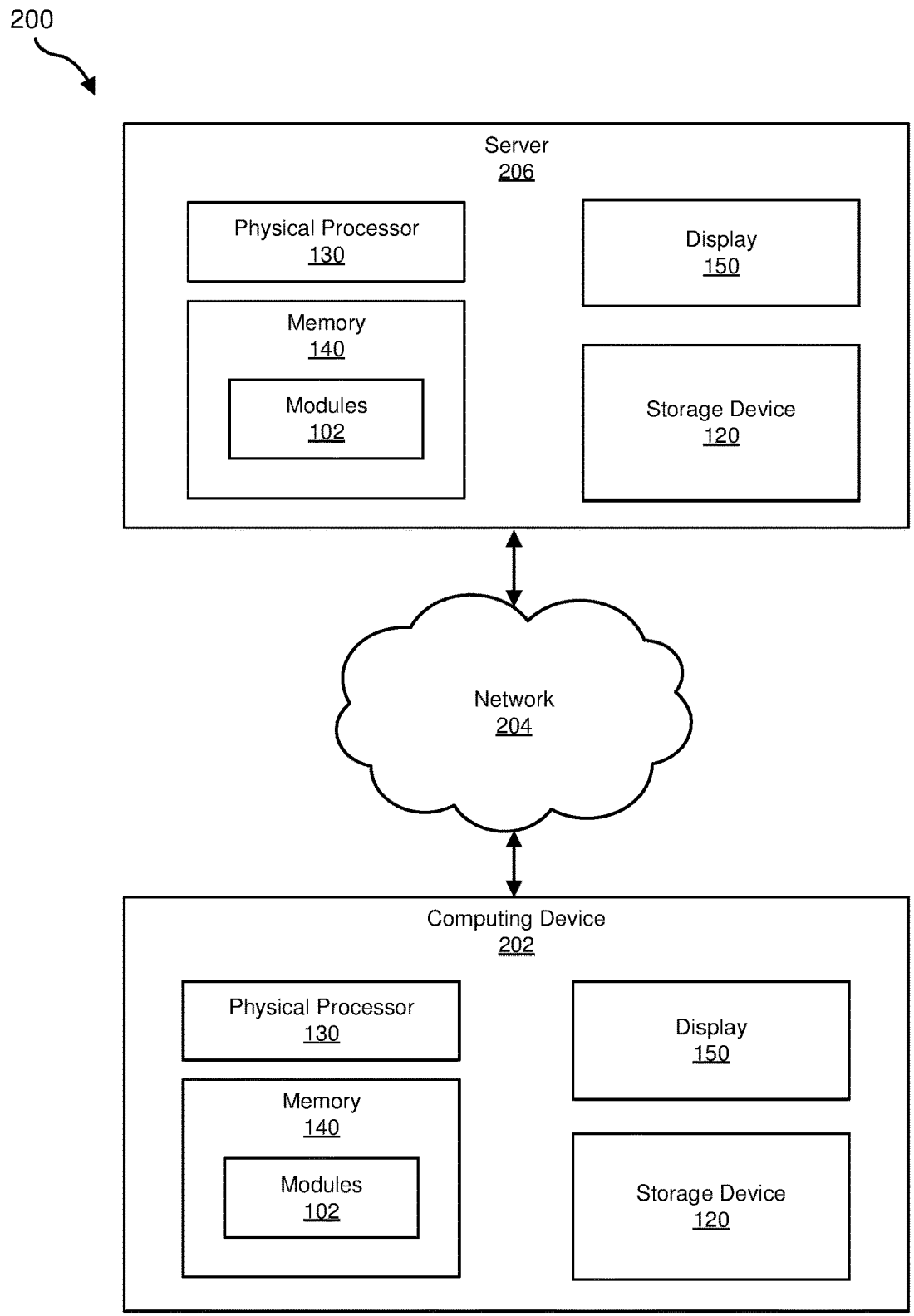
FIG. 2 is a block diagram of an additional example system for identifying a malicious user interface.
Figure 3:
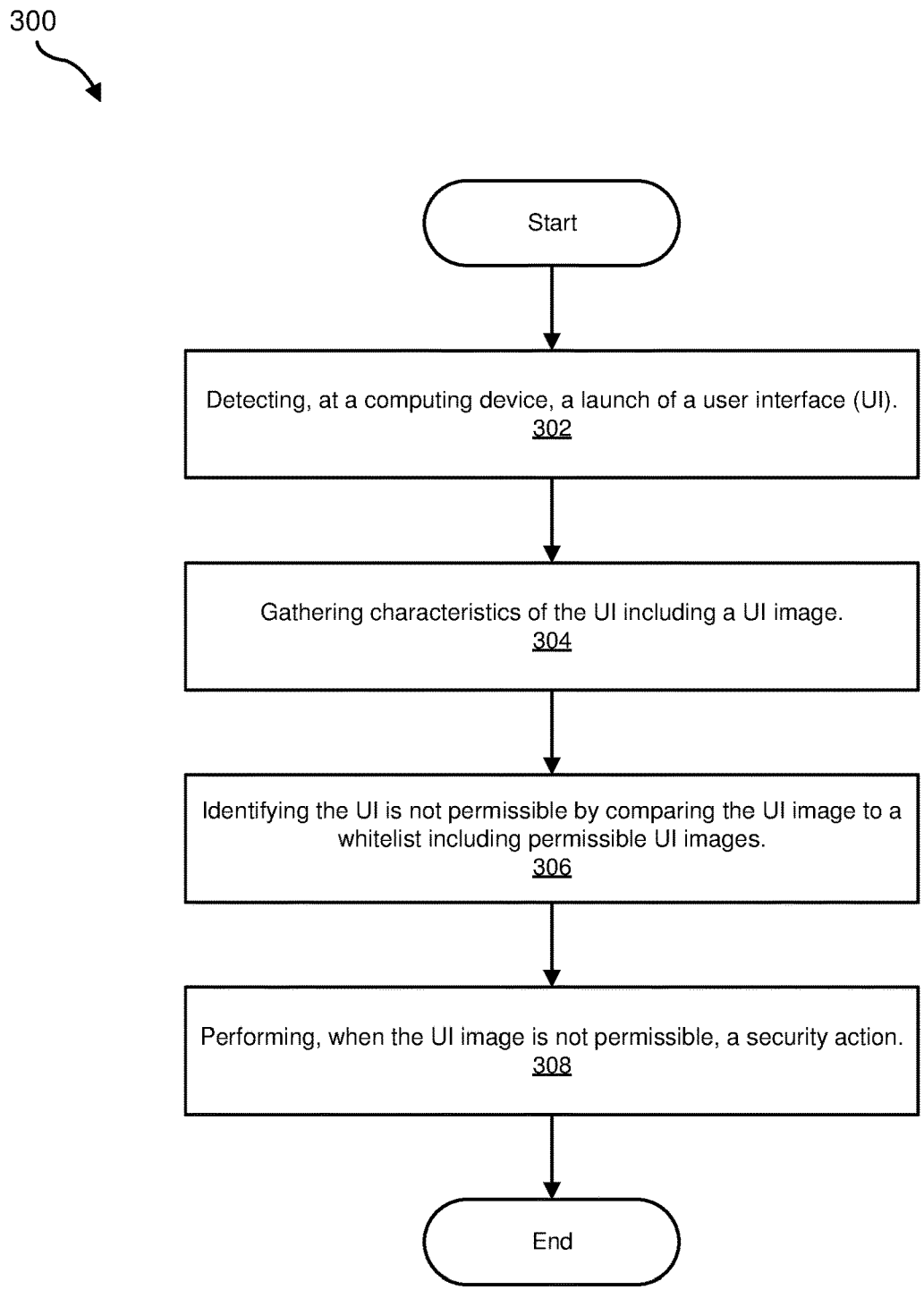
FIG. 3 is a flow diagram of an example method for identifying a malicious user interface.
Figure 4:
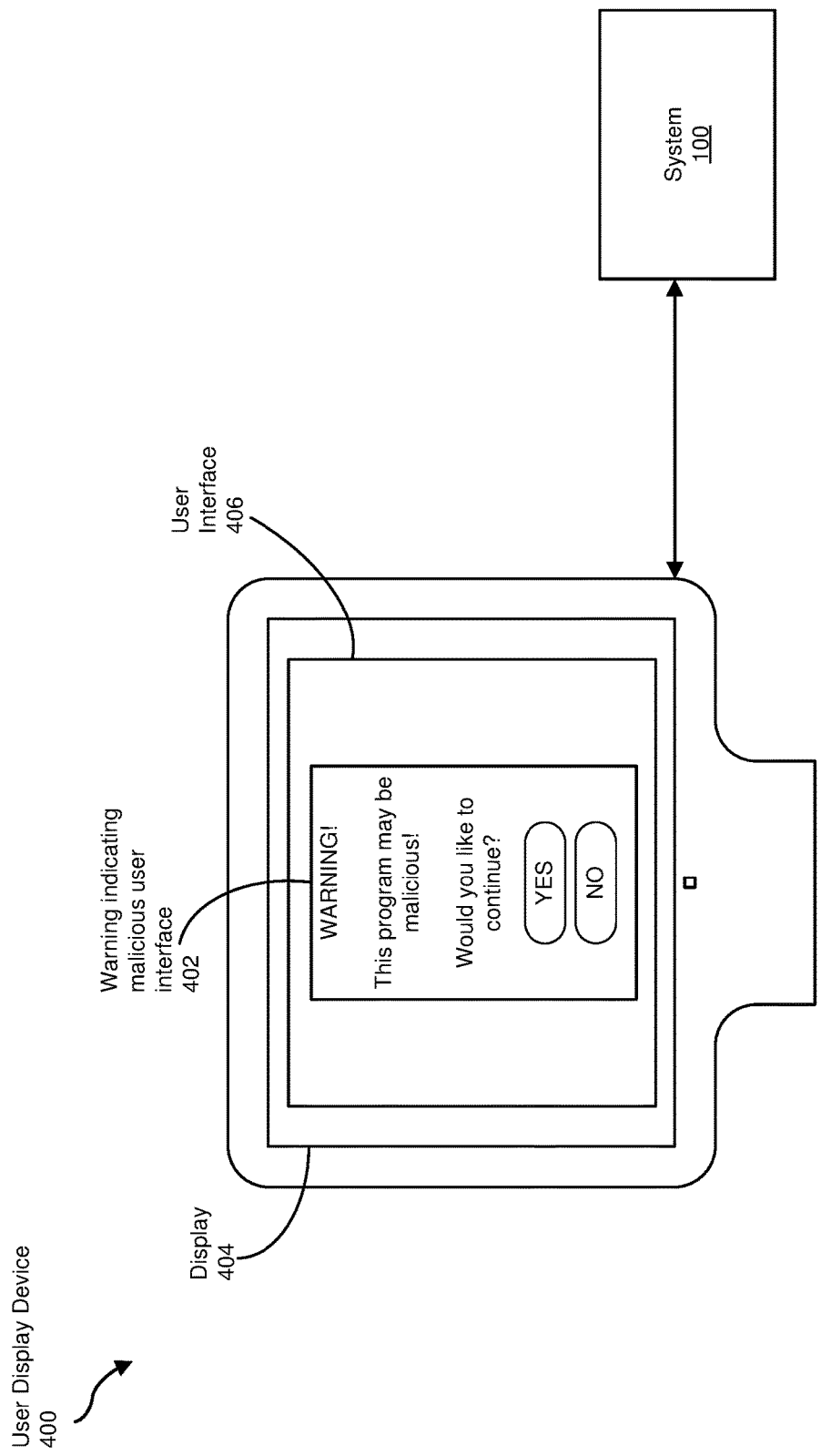
FIG. 4 is a block diagram of an example warning message on a user display device.

The following will provide, with reference to FIGS. 1-2 and 4, detailed descriptions of example systems for identifying a malicious user interface. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for identifying a malicious user interface. As illustrated in this figure, example system 100 may include one or more modules 102 for performing one or more tasks. As will be explained in greater detail below, modules 102 may include a detecting module 104, a gathering module 106, an identifying module 108, and a performing module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of user interface 121, characteristics of user interface 122, user interface image 123, whitelist 124, permissible user interface images 125, and/or security action 126. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying a malicious user interface. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more displays, such as display 150. In examples, display 150 may be a touchscreen. Thus, display 150 may be a touch sensing device configured to receive input, such as swipes, via users' touches imparted by users on display 150 when users touch display 150. In examples, display 150 may implement technologies such as capacitive sensing, resistive sensing, pressure sensing, etc. Display 150 may also be an image (e.g., video) display device configured to display user interface 121.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify a malicious user interface. For example, and as will be described in greater detail below, one or more of modules 102 may cause computing device 202 and/or server 206 to (1) detect, at computing device 202 and/or server 206, a launch of user interface (UI) 121, (2) gather characteristics of UI 122 including UI image 123, (3) identify UI 121 is not permissible by comparing UI image 123 to whitelist 124 including permissible UI images 125, and (4) perform, when UI image 123 is not permissible, security action 126.

Computing device 202 generally represents any type or form of computing device capable of reading computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that reads computer-executable instructions. For example, server 206 may represent a server running server-side software, such as anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

As used herein, the term "malware" generally represents any type or form of computer-executable instructions that execute malicious acts. Malicious acts may include, and are not limited to, stealing data, corrupting data, unauthorized deleting of data, unauthorized encrypting of data, obtaining unauthorized privileges, authorizing fraudulent transactions, and/or downloading malicious payloads to perform additional malicious acts.

FIG. 3 is a flow diagram of an example computer-implemented method 300 for identifying a malicious user interface. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. Detailed examples follow the description of step 308.

As illustrated in FIG. 3, at step 302 one or more of the systems described herein may detect launches of user interfaces (UI). The systems described herein may perform step 302 in a variety of ways. For example, detecting module 104 may, as part of computing device 202 in FIG. 2, detect a launch of UI 121 by monitoring computing device 202 for launches of UI 121.

As illustrated in FIG. 3, at step 304 one or more of the systems described herein may gather characteristics of UIs including UI images. The systems described herein may perform step 304 in a variety of ways. For example, gathering module 106 may, as part of computing device 202 in FIG. 2, gather characteristics of UI 122 including UI image 123.

In some examples, the characteristics of the UI may include a trust rating of a process that launched the UI, a language of the UI, an authentication identifier, text displayed by the UI (e.g., titles, descriptions, descriptions of input fields), a layout of the UI, a size of the UI, a locale of the UI, a locale of an operating system, operating system characteristics, device environment characteristics, and/or an identification of a process that launched the UI. Further, the characteristics of the UI may include at least a portion of an image displayed by the UI (e.g., a collection of pixel data).

As illustrated in FIG. 3, at step 306 one or more of the systems described herein may identify UIs are not permissible by comparing UI characteristics (e.g., UI images) to whitelists and/or blacklists. The whitelists may include permissible UI characteristics such as permissible UI images. The blacklists may include impermissible UI characteristics such as impermissible UI images. The systems described herein may perform step 306 in a variety of ways. For example, identifying module 108 may, as part of computing device 202 in FIG. 2, identify UI 121 as not permissible by comparing UI image 123 to whitelist 124. Whitelist 124 includes permissible UI images 125 to which UI image 123 may be compared.

In some embodiments, comparing UI images to whitelists and/or blacklists may identify user interfaces as suspicious and/or needing further analysis to confirm as safe or to confirm as malicious. In examples, whitelists and/or blacklists may be static or dynamic. Further, whitelists and/or blacklists may be updated based on user responses to security actions. For example, users selecting to continue past security action warnings may trigger updates to whitelists and/or blacklists.

In some examples, one or more of the systems described herein may identify UIs are not permissible and/or are permissible by comparing at least portions of UI images to master sets of images to identify matches or absences of matches. Master sets of images may include known-good and/or known-malicious images. For example, a master set of images may include known-good images of WINDOWS UIs.

In some examples, one or more of the systems described herein may identify UIs are not permissible and/or are permissible based on a frequency of display (i.e., uniqueness) of the UIs. For example, when a UI detected in step 302 is identified as infrequently displayed, relative to other commonly displayed UIs, the UI detected in step 302 is more likely to be malicious.

In some examples, one or more of the systems described herein may identify UIs are not permissible and/or are permissible based on correlating UI characteristics with each other. For example, when UI characteristics do not correlate, then the UI may be deemed not permissible, suspicious, and/or malicious. In embodiments, when UI text does not correlate with processes that initiated the UIs, then the UIs are identified as not permissible, suspicious, and/or malicious. For example, when UI text requests entry of an OUTLOOK email password and an unknown process initiated the UI, then the UI is identified as not permissible, suspicious, and/or malicious. In other examples, when languages of UI text do not correlate with languages of environments within which the UIs run, then the UIs are identified as not permissible, suspicious, and/or malicious. For example, when UI text is in English and the operating system language is Mandarin Chinese (indicating the device is likely in China), then the UI is identified as not permissible, suspicious, and/or malicious.

In embodiments, there may be a hierarchy to the identifying process in step 306. For example, method 300 may compare UI images first, compare UI text second, and then compare a third characteristic.

As illustrated in FIG. 3, at step 308 one or more of the systems described herein may perform, when UI images are not permissible, security actions. The systems described herein may perform step 308 in a variety of ways. For example, performing module 110 may, as part of computing device 202 in FIG. 2, perform security action 126 when UI image 123 is not permissible.

In some examples, security actions may include preventing data entry into UIs and/or displaying warnings on user displays. In additional examples, the security actions may include displaying, on user displays, warnings indicating that the UIs are potentially malicious. FIG. 4 depicts an example of a user display device 400 including display 404 (e.g., display 150) which may present user interface 406 (e.g., UI 121). In this non-limiting example, user display device 400 may display warning message 402 as at least a part of security action 126 in response to identifying user interface 406 as malicious.

Returning to FIG. 3, in some embodiments, (1) gathered characteristics of the user interfaces may include trust ratings of processes that launched the UIs, languages of the UIs, sizes of the UIs, layouts of the UIs, and/or authentication identifiers, (2) identifying may include comparing the trust ratings of the processes that launched the UIs, the languages of the UIs, sizes of the UIs, layouts of the UIs, and/or the authentication identifiers to the whitelists and/or the blacklists to identify mismatches, and (3) security actions may be performed when there are mismatches. For example, if UI text states "MICROSOFT" originated the UI, and an image comparison yields that the UI image matches a known MICROSOFT login page, but the process that launched the UI does not have a MICROSOFT authentication signature and an unknown process initiated the UI, then the UI is identified as suspicious and/or malicious.

In an example, gathered characteristics of the user interfaces may include languages of the UIs and methods may further include: (1) gathering operating system (OS) characteristics including OS languages, (2) comparing the OS languages to languages of the UIs to identify mismatches, and (3) performing security actions when there are mismatches. For example, (1) analyzing a UI may indicate the UI uses a first language of a first locale and (2) analyzing an OS may indicate the OS uses a second language of a second locale and that no previous attempts were made to launch an application with the first language. Under these conditions, it appears a user who does not normally interact with an application having a locale of the first language has attempted to open an unknown application that may be malicious.

Furthermore, in examples, gathered characteristics of the user interfaces may include text displayed by the UIs and identification of a processes that launched the UIs, and methods may include (1) comparing the text displayed by the UIs to the identification of the processes that launched the UIs to identify mismatches and (2) performing security actions when there are mismatches.

In an example, methods may include (1) identifying the UIs are child windows of parent windows, (2) identifying processes that launched the child windows, (3) identifying processes that launched the parent windows, (4) comparing the processes that launched the child windows to the processes that launched the parent windows to identify mismatches, and (5) performing security actions when there are mismatches. For example, a first process may create and display a child window in a parent window produced by a second process, where the two processes have different trust levels. Under these circumstances, the characteristics of the UI indicate that the first process likely is not an authorized portion of the second process.

As detailed above, the steps outlined in method 300 in FIG. 3 may enable computing devices to automatically detect suspicious and/or malicious user interfaces. For example, the systems described herein may compare characteristics of a user interface to whitelists of known good user interface characteristics and/or blacklists of known malicious user interface characteristics to characterize a respective user interface as permissible and/or impermissible. By doing so, the systems and methods described herein may improve a state of security of target computing devices, potentially resulting in significant time and/or monetary savings.

Figure 5:
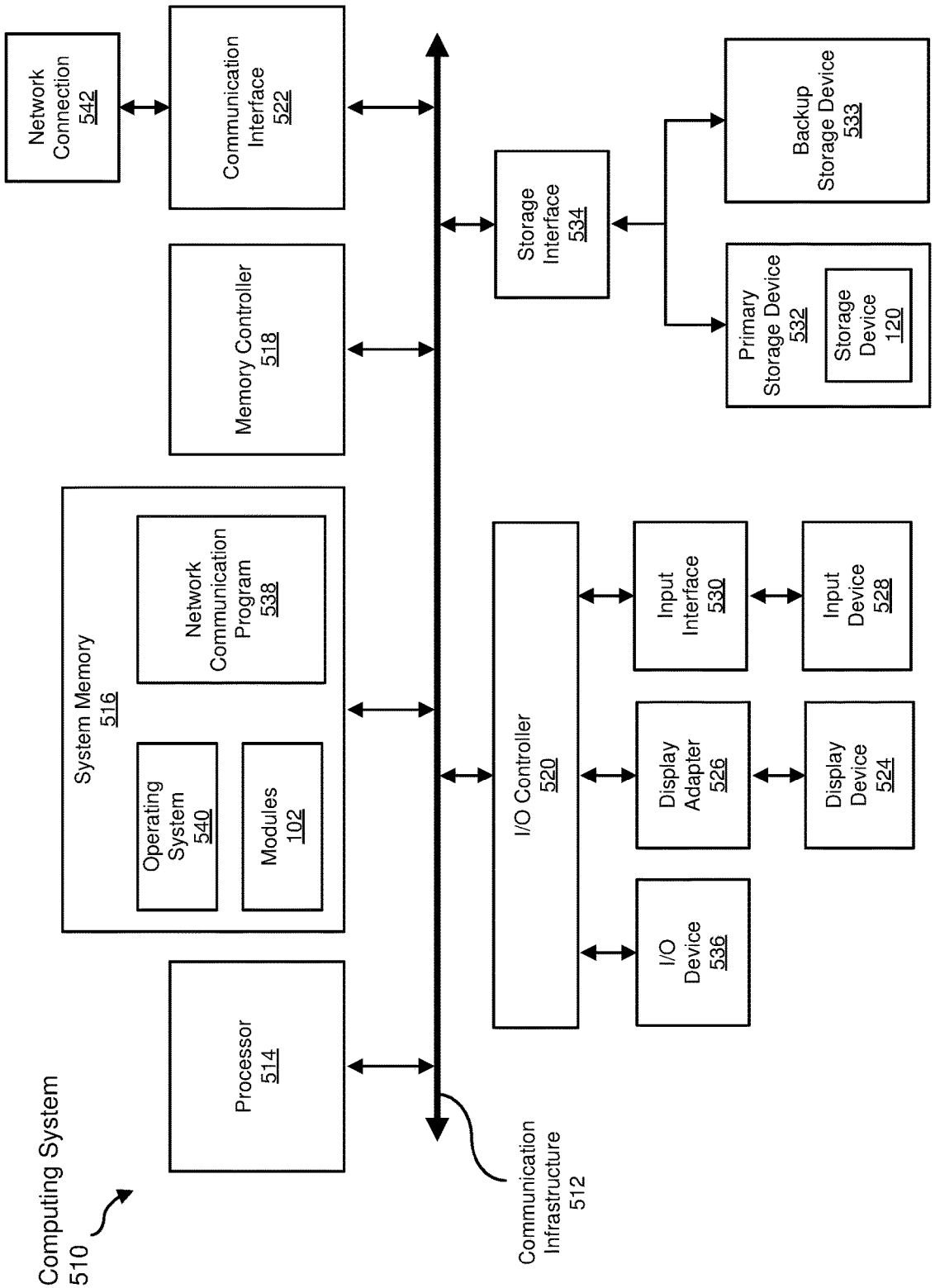
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, user interface 121, characteristics of the user interface 122, user interface image 123, whitelist 124, permissible user interface images 125, and/or security action 126 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
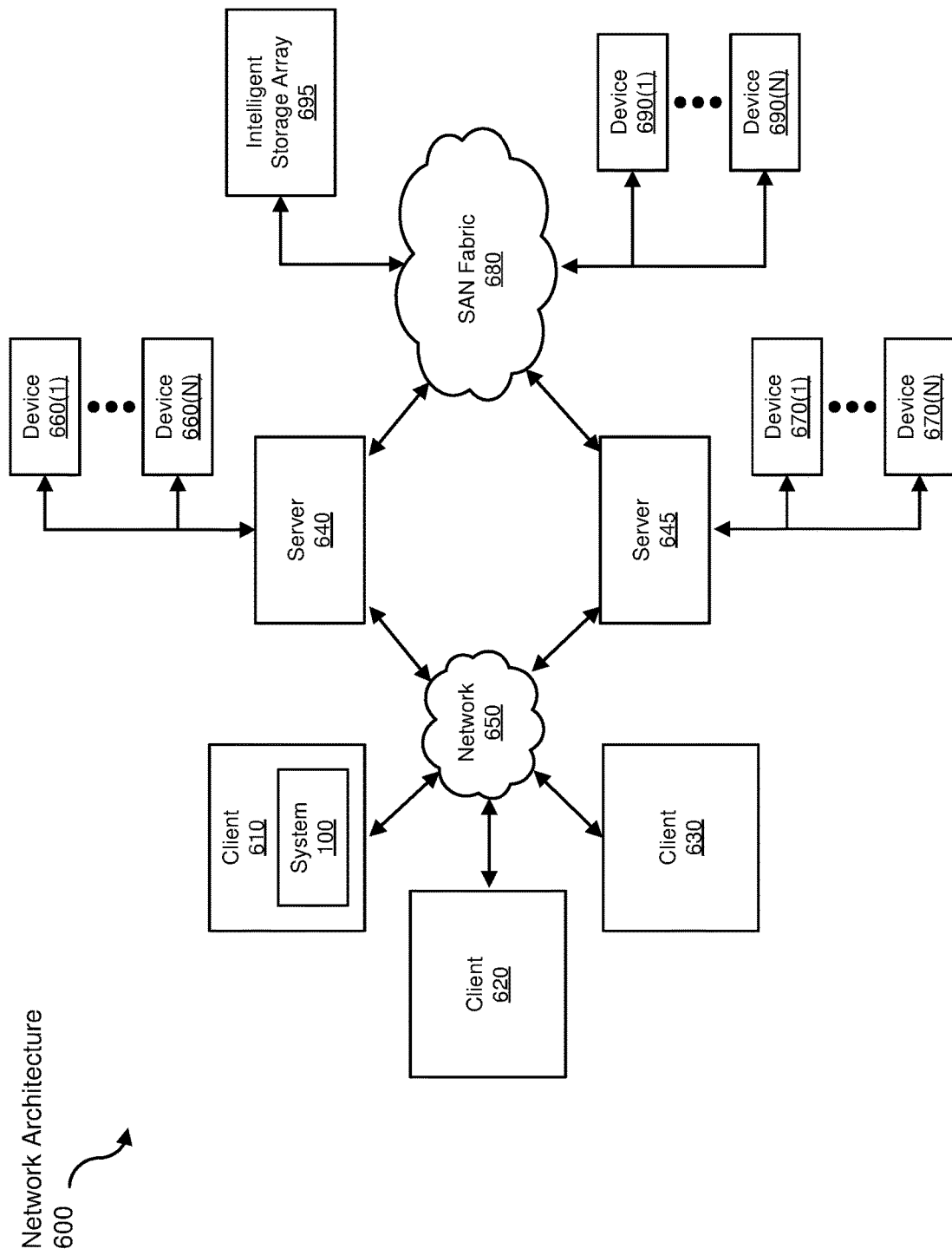
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of a method for identifying a malicious user interface.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive characteristics of a user interface to be transformed, transform the characteristics of a user interface, output a result of the transformation to a user display, use the result of the transformation to identify a respective user interface as malicious, and/or store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying a malicious user interface, at least a portion of the method being performed by a computing device comprising at least one processor, the method comprising:
   detecting, at the computing device, a launch of a user interface (UI);
   gathering characteristics of the UI including a UI image, wherein the UI Image is displayed on a video display device coupled to the computing device;
   identifying, by the computing device, the UI is not permissible by automatically comparing the UI image displayed on the video display device to a whitelist including permissible UI images; and
   performing, when the UI image is not permissible, a security action.

2. The computer-implemented method of claim 1, wherein the characteristics further comprise a trust rating of a process that launched the UI, a language of the UI, and an authentication identifier; wherein the identifying further comprises comparing the trust rating of the process that launched the UI, the language of the UI, and the authentication identifier to the whitelist to identify a mismatch; and further comprising:
   performing the security action when there is a mismatch.

3. The computer-implemented method of claim 1, wherein the characteristics further comprise a language of the UI and further comprising:
   gathering operating system (OS) characteristics including an OS language;
   comparing the OS language to the language of the UI to identify a mismatch; and
   performing the security action when there is a mismatch.

4. The computer-implemented method of claim 1, wherein the characteristics further comprise text displayed by the UI and an identification of a process that launched the UI, and further comprising:
   comparing the text displayed by the UI to the identification of the process that launched the UI to identify a mismatch; and
   performing the security action when there is a mismatch.

5. The computer-implemented method of claim 1, further comprising:
   identifying the UI is a child window of a parent window;
   identifying a process that launched the child window;
   identifying a process that launched the parent window;
   comparing the process that launched the child window to the process that launched the parent window to identify a mismatch; and
   performing the security action when there is a mismatch.

6. The computer-implemented method of claim 1, wherein the security action comprises preventing data entry into the UI and displaying a warning on the video display device.

7. The computer-implemented method of claim 1, wherein the security action comprises displaying, on the video display device, a pop-up box indicating that the UI is potentially malicious.

8. A system for identifying a malicious user interface, the system comprising:
   a detecting module, stored in a memory, that detects a launch of a user interface (UI);
   a gathering module, stored in the memory, that gathers characteristics of the UI including a UI image, wherein the UI Image is displayed on a video display device;
   an identifying module, stored in the memory, that identifies the UI is not permissible by automatically comparing the UI image displayed on the video display device to a whitelist including permissible UI images;
a performing module, stored in the memory, that performs a security action when the UI image is not permissible; and
at least one physical processor that executes the detecting module, the gathering module, the identifying module, and the performing module.

9. The system of claim 8, wherein the characteristics further comprise a trust rating of a process that launched the UI, a language of the UI, and an authentication identifier; wherein the identifying further comprises comparing the trust rating of the process that launched the UI, the language of the UI, and the authentication identifier to the whitelist to identify a mismatch; and further comprising:
a second performing module, stored in the memory, that performs the security action when there is a mismatch.

10. The system of claim 8, wherein the characteristics further comprise a language of the UI and further comprising:
a second gathering module, stored in the memory, that gathers operating system (OS) characteristics including an OS language;
a comparing module, stored in the memory, that compares the OS language to the language of the UI to identify a mismatch; and
a second performing module, stored in the memory, that performs the security action when there is a mismatch.

11. The system of claim 8, wherein the characteristics further comprise text displayed by the UI and an identification of a process that launched the UI, and further comprising:
a comparing module, stored in the memory, that compares the text displayed by the UI to the identification of the process that launched the UI to identify a mismatch; and
a second performing module, stored in the memory, that performs the security action when there is a mismatch.

12. The system of claim 8, further comprising:
a first identifying module, stored in the memory, that identifies the UI is a child window of a parent window;
a second identifying module, stored in the memory, that identifies a process that launched the child window;
a third identifying module, stored in the memory, that identifies a process that launched the parent window;
a comparing module, stored in the memory, that compares the process that launched the child window to the process that launched the parent window to identify a mismatch; and
a second performing module, stored in the memory, that performs the security action when there is a mismatch.

13. The system of claim 8, wherein the security action comprises preventing data entry into the UI and displaying a warning on the video display device.

14. The system of claim 8, wherein the security action comprises displaying, on the video display device, a pop-up box indicating that the UI is potentially malicious.

15. A non-transitory computer-readable medium comprising one or more computer-executable instructions that, when executed by at least one processor of a computing device, cause the computing device to:
detect, at the computing device, a launch of a user interface (UI);
gather characteristics of the UI including a UI image, wherein the UI Image is displayed on a video display device coupled to the computing device;
identify, by the computing device, the UI is not permissible by automatically comparing the UI image displayed on the video display device to a whitelist including permissible UI images; and
perform, when the UI image is not permissible, a security action.

16. The non-transitory computer-readable medium of claim 15, wherein the characteristics further comprise a trust rating of a process that launched the UI, a language of the UI, and an authentication identifier; wherein the identifying further comprises comparing the trust rating of the process that launched the UI, the language of the UI, and the authentication identifier to the whitelist to identify a mismatch; and further comprising one or more computer-executable instructions that, when executed by the at least one processor of the computing device, cause the computing device to:
perform the security action when there is a mismatch.

17. The non-transitory computer-readable medium of claim 15, wherein the characteristics further comprise a language of the UI and further comprising one or more computer-executable instructions that, when executed by the at least one processor of the computing device, cause the computing device to:
gather operating system (OS) characteristics including an OS language;
compare the OS language to the language of the UI to identify a mismatch; and
perform the security action when there is a mismatch.

18. The non-transitory computer-readable medium of claim 15, wherein the characteristics further comprise text displayed by the UI and an identification of a process that launched the UI, and further comprising one or more computer-executable instructions that, when executed by the at least one processor of the computing device, cause the computing device to:
compare the text displayed by the UI to the identification of the process that launched the UI to identify a mismatch; and
perform the security action when there is a mismatch.

19. The non-transitory computer-readable medium of claim 15, further comprising one or more computer-executable instructions that, when executed by the at least one processor of the computing device, cause the computing device to:
identify the UI is a child window of a parent window;
identify a process that launched the child window;
identify a process that launched the parent window;
compare the process that launched the child window to the process that launched the parent window to identify a mismatch; and
perform the security action when there is a mismatch.

20. The non-transitory computer-readable medium of claim 15, wherein the security action comprises preventing data entry into the UI and displaying a warning on the video display device.

21. The computer-implemented method of claim 1, wherein the UI image is a video image displayed by the UI.

\* \* \* \* \*